United States Patent
Yuan et al.

(10) Patent No.: US 12,229,983 B2
(45) Date of Patent: Feb. 18, 2025

(54) METHOD AND IMAGE-PROCESSING DEVICE FOR DETERMINING A PROBABILITY VALUE INDICATING THAT AN OBJECT CAPTURED IN A STREAM OF IMAGE FRAMES BELONGS TO AN OBJECT TYPE

(71) Applicant: Axis AB, Lund (SE)

(72) Inventors: Song Yuan, Lund (SE); Ludvig Hassbring, Lund (SE)

(73) Assignee: AXIS AB, Lund (SE)

( * ) Notice: Subject to any disclaimer, the term of this patent is extended or adjusted under 35 U.S.C. 154(b) by 0 days.

(21) Appl. No.: 18/244,337

(22) Filed: Sep. 11, 2023

(65) Prior Publication Data
US 2024/0104760 A1 Mar. 28, 2024

(30) Foreign Application Priority Data
Sep. 23, 2022 (EP) .................... 22197521

(51) Int. Cl.
*G06K 9/00* (2022.01)
*G06T 7/12* (2017.01)
(Continued)

(52) U.S. Cl.
CPC .......... *G06T 7/70* (2017.01); *G06T 7/12* (2017.01); *G06V 10/25* (2022.01); *G06V 20/52* (2022.01);
(Continued)

(58) Field of Classification Search
CPC .. G06T 2207/30242; G06T 7/70; G06V 20/52
See application file for complete search history.

(56) References Cited

U.S. PATENT DOCUMENTS 9,055,202 B1 * 6/2015 Scalisi ................ H04N 7/183
2015/0054949 A1 * 2/2015 Scalisi ................ H04N 23/631
348/143
(Continued)

FOREIGN PATENT DOCUMENTS

WO 2021/046607 A1 3/2021

OTHER PUBLICATIONS

Jayarajah et al., "ComAI: Enabling Lightweight, Collaborative Intelligence by Retrofitting Vision DNNs", IEEE INFOCOM, IEEE Conference on Computer Communication, 2022, pp. 41-50.

*Primary Examiner* — Hadi Akhavannik
(74) *Attorney, Agent, or Firm* — XSENSUS LLP

(57) ABSTRACT

A method includes detecting a first object in a first area of a scene; determining, based on characteristics of the first object, a first probability value indicating a first probability that the detected first object; detecting a second object in a second area of the scene captured in a second stream of image frames by a second camera of the camera system different from the first camera, wherein the second area at least partly overlaps the first area; determining, based on characteristics of the second object, a second probability value indicating a second probability that the detected second object; and when the second probability value is below a second threshold value and the first probability value is above a first threshold value determining an updated second probability value by increasing the second probability value.

13 Claims, 10 Drawing Sheets

(51) Int. Cl.
    *G06T 7/70*          (2017.01)
    *G06V 10/25*       (2022.01)
    *G06V 20/52*       (2022.01)

(52) U.S. Cl.
    CPC .............. *G06T 2207/30242* (2013.01); *G06V 2201/07* (2022.01)

(56) References Cited

U.S. PATENT DOCUMENTS

| | | | |
|---|---|---|---|
| 2016/0358032 A1 | 12/2016 | Sevin et al. | |
| 2017/0344835 A1* | 11/2017 | Singh | G06V 20/54 |
| 2019/0034746 A1* | 1/2019 | Feng | G06T 7/0002 |
| 2019/0340424 A1* | 11/2019 | Behrenberg | G06V 10/768 |
| 2020/0175279 A1* | 6/2020 | Chen | G06V 20/10 |

* cited by examiner

METHOD AND IMAGE-PROCESSING DEVICE FOR DETERMINING A PROBABILITY VALUE INDICATING THAT AN OBJECT CAPTURED IN A STREAM OF IMAGE FRAMES BELONGS TO AN OBJECT TYPE

CROSS-REFERENCE TO RELATED APPLICATION

This application claims priority to European Patent Application No. 22197521.2 filed on Sep. 23, 2022, the entire disclosure of which is incorporated by reference herein.

TECHNICAL FIELD

The embodiments herein relate to a method and an image-processing device for determining a probability value indicating that an object captured in a stream of image frames belongs to an object type. A corresponding computer program and a computer program carrier are also disclosed.

BACKGROUND

Surveillance of the public using imaging, in particular video imaging, is common in many areas around the world. Areas that may need monitoring are for example banks, stores, and other areas where security is needed, such as schools and government facilities. However, it is illegal to mount cameras in many places without having a license/permission. Other areas that may need monitoring are processing, manufacturing and logistics applications where video surveillance is primarily used to monitor processes.

However, there may be requirements to not be able to identify persons from the video surveillance. The requirement to not be able to identify persons may be in contrast to the requirement of being able to determine what is happening in the video. For example, it may be of interest to perform people counting or queue monitoring on anonymous image data. In practice, there is a trade-off between meeting these two requirements: non-identifiable video and extracting large amounts of data for different purposes such as people counting.

Several image-processing techniques have been described to avoid identifying persons while still being able to recognize activities. For example, edge detection/representation, edge enhancement, silhouetting objects, and different sorts of "colour blurring", such as colour variation or dilation are such examples of manipulations. Privacy masking is another image-processing technique used in video surveillance to protect personal privacy by concealing parts of an image from view with a masked area.

Image processing refers to any processing that is applied to an image. The processing can include application of various effects, masks, filters or the like, to the image. In this manner, the image can e.g. be sharpened, converted to grey scale, or altered in some way. The image has typically been captured by a video camera, a still image camera or the like.

As mentioned above one way to avoid identification of persons is by masking moving people and objects in images in real time. Masking in live and recorded video can be done by comparing a live camera view with a set background scene and applying dynamic masking to areas of change—essentially moving people and objects. Color masking, which may also be referred to solid color masking or monochrome masking where an object is masked by an overlaid solid mask of a certain color, provides privacy protection while enabling you to see movements. Mosaic masking, also referred to as pixelation, pixelated privacy masking or transparent pixelated masking shows moving objects in lower resolution and allows you to better distinguish forms by seeing an object's colors.

Masking live and recorded video is suitable for remote video monitoring or recording in areas where surveillance is otherwise problematic due to privacy rules and regulations. It's ideal for processing, manufacturing and logistics applications when video surveillance is primarily used to monitor processes. Other potential applications are in retail, education and at government facilities.

Before masking an object, the object may need to be detected as an object to be masked, or in other words categorised as an object to be masked. US20180268240A1 discloses a method comprising acquiring a video of a scene, detecting objects in the scene, determining an object detection probability value indicating a likelihood of a detected object belonging to an object category to be redacted and redacting the video by obfuscating the detected object belonging to the object category to be redacted.

A challenging problem seen when dynamic masking is used in a monitoring system is that a detection of a partly occluded person will give a much lower detection score, such as a lower object detection probability value, as compared to the detection score obtained for a detection of a non-occluded person. The occlusion may be due to another object in the scene. The lower detection score may result in that the partly occluded person is not masked in a captured video stream. For example, if half of the object (e.g., a person) captured in a video stream is occluded, the detection score obtained from the object detector may be 67% that the object is a human being, while the detection score may be 95% if the captured object is not occluded. If the threshold detection score for masking humans in the video stream is set to e.g., 80%, the partly occluded person will not be masked while the non-occluded object will be masked. This is a problem since also the partly occluded person should be masked in order to avoid identification.

SUMMARY

An object of embodiments herein may thus be to obviate some of the problems mentioned above, or at least reduce the impact of them. Specifically, an object of embodiments herein may be how to detect captured objects in a stream of images that are occluded by other objects and how to classify them according to known object types. For example, it may be an object of embodiments herein to detect humans in a stream of video images although the humans are not completely visible in the stream of images. Once the object is classified as a human the classification may lead to masking of the human or to counting of the human.

Thus, a further object of embodiments herein may be to de-identify or anonymize persons in a stream of image frames, e.g., by masking the persons, while still being able to determine what is happening in the stream of image frames.

A further object may be to improve determining a probability value indicating whether an object captured in a stream of image frames belongs to an object type, for example an object type to be masked, filtered or counted. In other words, a further object may be to improve determination of an object detection probability value indicating a likelihood of a detected object belonging to a specific object category.

According to an aspect, the object is achieved by a method, performed in a multi-camera system, for determining a probability value indicating whether an object captured in a stream of image frames belongs to an object type.

The method comprises detecting a first object or a first part of the first object in a first area of a scene captured in a first stream of image frames captured by a first camera of the multi-camera system.

The method further comprises determining, based on characteristics of the first object or of the first part of the first object, a first probability value indicating a probability that the detected first object or first part belongs to the object type.

The method further comprises detecting a second object or a second part of the second object in a second area of the scene captured in a second stream of image frames by a second camera of the camera system different from the first camera, wherein the second area at least partly overlaps the first area.

The method further comprises determining, based on characteristics of the second object or of the second part of the second object, a second probability value indicating a probability that the detected second object or the second part belongs to the object type.

The method further comprises when the second probability value is below a second threshold value and the first probability value is above a first threshold value determining an updated second probability value by increasing the second probability value.

According to another aspect, the object is achieved by an image-processing device configured to perform the above method.

According to further aspects, the object is achieved by a computer program and a computer program carrier corresponding to the aspects above.

Embodiments herein use a probability value from another camera indicating that the detected first object or first part belongs to the object type.

Since the second probability value is increased when the second probability value is below the second threshold value and the first probability value is above the first threshold value the second probability value can be compensated when the second objects are occluded. By doing so it is possible to compensate the second probability value for specific objects with a high first probability value from the first camera. This means that there will be an increased probability of detecting that second objects belong to a certain object type even though they are partly occluded in the second camera while still having a low number of second objects that are detected falsely as the object type to be detected, i.e., a low number of false positive detections.

Thus, an advantage of embodiments herein is an increased probability of detecting objects of a certain object type that are partly occluded in a certain camera. Therefore, detection of certain types or categories of objects may be improved. Detection of an object may be determined when a probability value indicates that the object captured in the stream of image frames belongs to an object type. For example, it is determined that the second object belongs to the object type to be detected when the second probability value indicates that the second object or the second part belongs to the object type. For example, a high second probability value may indicate that the second object or the second part belongs to the object type, while a low second probability value may indicate that the second object or the second part does not belong to the object type. High and low probability values may be identified by one or more threshold values.

A further advantage is that masking of certain types of objects is improved. A yet further advantage is that counting of certain types of objects is improved.

BRIEF DESCRIPTION OF THE DRAWINGS

The various aspects of embodiments disclosed herein, including particular features and advantages thereof, will be readily understood from the following detailed description and the accompanying drawings, in which.

DETAILED DESCRIPTION

Figure 1:
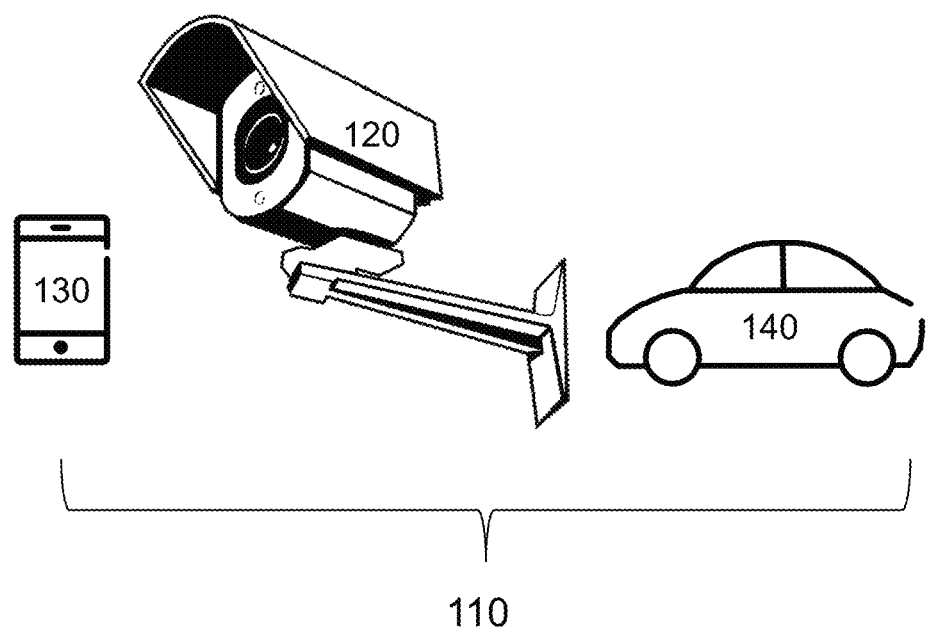
FIG. 1 illustrates exemplifying embodiments of image-capturing devices.

Embodiments herein may be implemented in one or more image-processing devices. In some embodiments herein the one or more image-processing devices may comprise or be one or more image-capturing devices such as a digital camera. FIG. 1 depicts various exemplifying image-capturing devices 110. The image-capturing device 110 may e.g., be or comprise any of a camcorder, a network video recorder, a camera, a video camera 120 such as a surveillance camera or a monitoring camera, a digital camera, a wireless communication device 130, such as a smartphone, including an image sensor, or a car 140 including an image sensor.

Figure 2A:
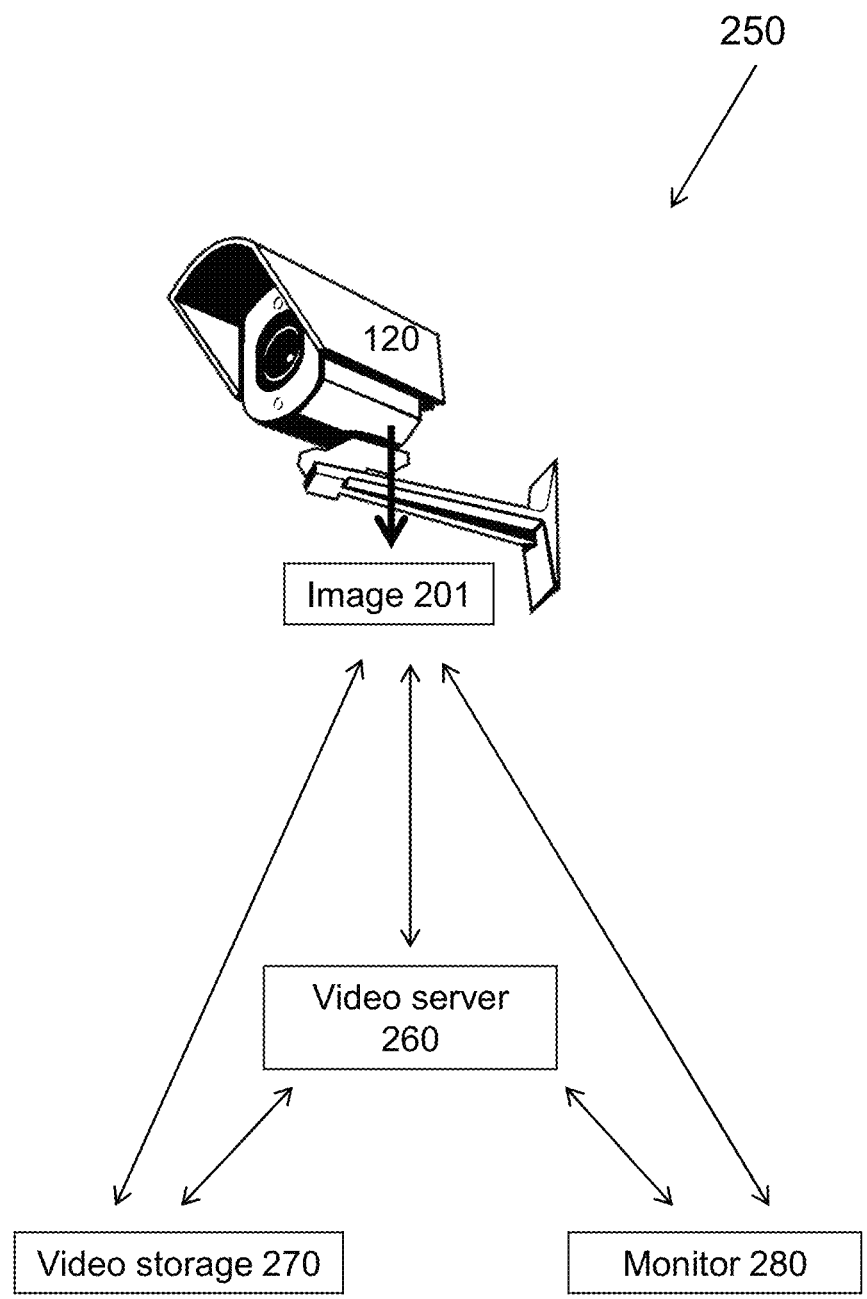
FIG. 2a illustrates exemplifying embodiments of a video network system.

FIG. 2a depicts an exemplifying video network system 250 in which embodiments herein may be implemented. The video network system 250 may include an image-capturing device, such as the video camera 120, which can capture and perform image processing on a digital image 201, such as a digital video image. A video server 260 in FIG. 2a may obtain the image, for example from the video camera 120 over a network or the like, which is indicated in FIG. 2a with the double-pointing arrows.

The video server 260 is a computer-based device that is dedicated to delivering video. Video servers are used in a number of applications, and often have additional functions and capabilities that address the needs of particular applications. For example, video servers used in security, surveillance and inspection applications typically are designed to capture video from one or more cameras and deliver the video via a computer network. In video production and broadcast applications, a video server may have the ability to record and play recorded video, and to deliver many video streams simultaneously. Today, many video server functions may be built-in in the video camera 120.

However, in FIG. 2a, the video server 260 is connected over the video network system 250, to the image-capturing device, here exemplified by the video camera 120. The video server 260 may further be connected to a video storage 270 for storage of video images, and/or connected to a monitor 280 for display of video images. In some embodiments the video camera 120 is connected directly with the video storage 270 and/or the monitor 280, as indicated by the direct arrows between these devices in FIG. 2a. In some other embodiments the video camera 120 is connected to the video storage 270 and/or the monitor 280 via the video server 260, as indicated by the arrows between the video server 260 and the other devices.

Figure 2B:
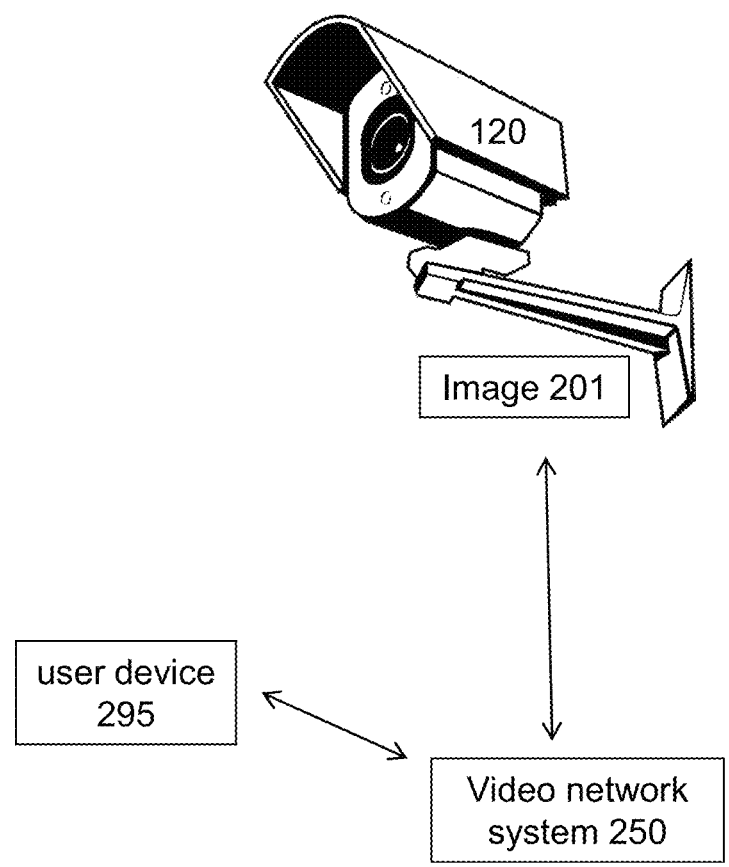
FIG. 2b illustrates exemplifying embodiments of a video network system and a user device.

FIG. 2b depicts a user device 295 connected to the video camera 120 via the video network system 250. The user device 295 may for example be a computer or a mobile phone. The user device 295 may e.g., control the video camera 120 and/or display video emanating from the video camera 120. The user device 295 may further include both the functionality of the monitor 280 and the video storage 270.

In order to better understand embodiments herein an imaging system will first be described.

Figure 3:
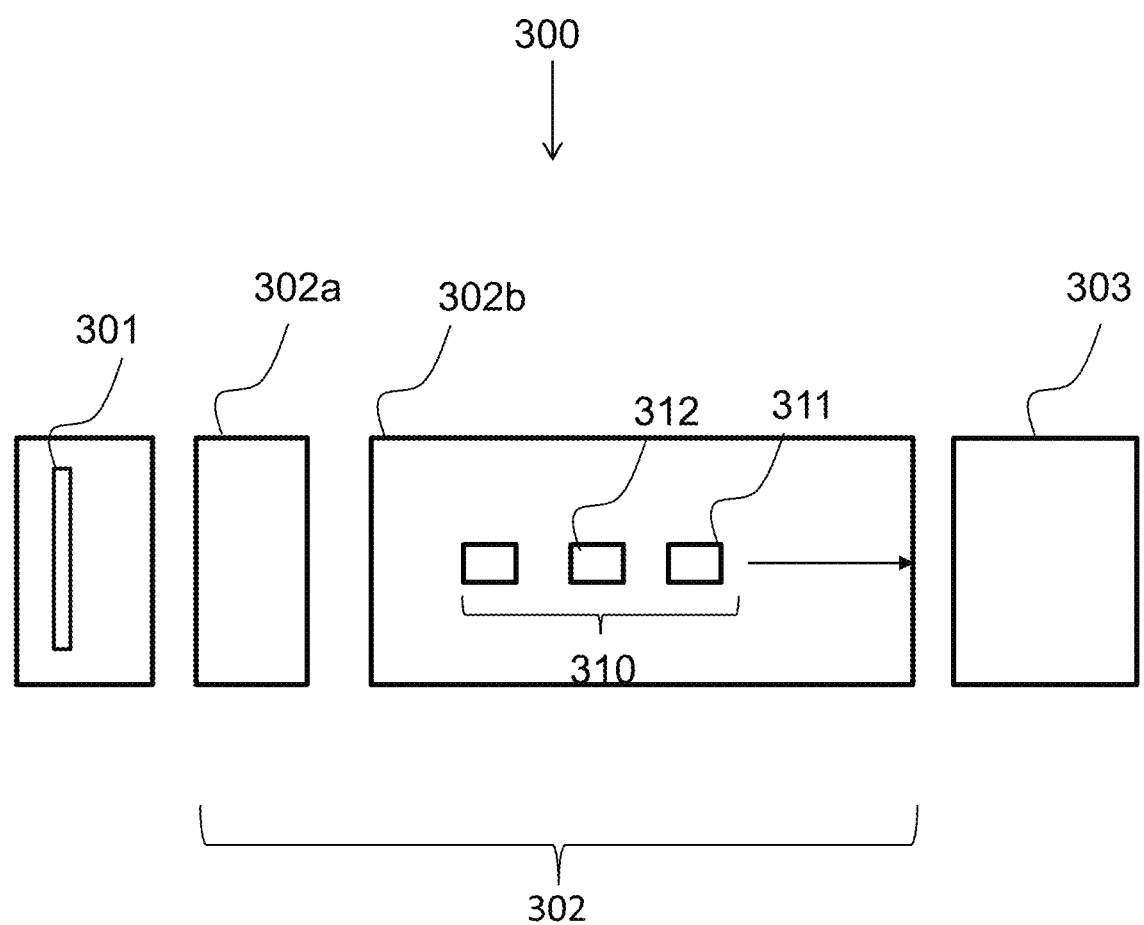
FIG. 3 is a schematic block diagram illustrating an exemplifying embodiment of an imaging system.

FIG. 3 is a schematic view of an imaging system 300, in this case of a digital video camera, such as the video camera 120. The imaging system images a scene on an image sensor 301. The image sensor 301 may be provided with a Bayer filter, such that different pixels will receive radiation of a particular wavelength region, in a known pattern. Typically, each pixel of the captured image is represented by one or more values representing the intensity of the captured light within a certain wavelength band. These values are usually referred to as colour components, or colour channels. The term "image" may refer to an image frame or video frame including information originating from an image sensor that has captured the image.

After having read the signal of individual sensor pixels of the image sensors 301, different image processing actions may be performed by an image signal processor 302. The image signal processor 302 may comprise an image processing part 302a, sometimes referred to as an image processing pipeline, and a video post-processing part 302b.

Typically for video processing the images are comprised in a stream of images. FIG. 3 illustrates a first image stream 310 from the image sensor 301. The first image stream 310 may comprise multiple captured image frames, such as a first captured image frame 311 and a second captured image frame 312.

Image processing may comprise demosaicing, color correction, noise filtering (for eliminating spatial and/or temporal noise), distortion correction (for eliminating effects of, e.g., barrel distortion), global and/or local tone mapping (e.g., enabling imaging of scenes containing a wide range of intensities), transformation (e.g., rectification and rotation), flat-field correction (e.g., for removal of the effects of vignetting), application of overlays (e.g., privacy masks, explanatory text), etc. The image signal processor 302 may also be associated with an analytics engine performing object detection, recognition, alarms, etc.

The image processing part 302a may e.g. perform image stabilization, apply noise filtering, distortion correction, global and/or local tone mapping, transformation, and flat-field correction. The video post-processing part 302b may for example crop parts of an image, apply overlays, and comprise the analytics engine.

Following the image signal processor 302 the image may be forwarded to an encoder 303, wherein the information in the image frames is coded according to an encoding protocol, such as H.264. The encoded image frames are then forwarded to for example a receiving client, exemplified here with the monitor 280, to the video server 260, the storage 270, etc.

The video coding process produces a number of values that may be encoded to form a compressed bit stream. These values may include:
   quantized transform coefficients,
   information to enable the decoder to re-create a prediction,
   information about a structure of the compressed data and compression tools used during encoding, and
   information about the complete video sequence.

These values and parameters (syntax elements) are converted into binary codes using for example variable length coding and/or arithmetic coding. Each of these encoding methods produces an efficient, compact binary representation of the information, also referred to as an encoded bit stream. The encoded bit stream may then be stored and/or transmitted.

In a camera system with multiple cameras, embodiments herein propose to use detection information from surrounding cameras to enhance a masking quality in a camera. For example, the masking quality may be enhanced by an increased probability of detecting objects of a specific object type even though the objects are partly occluded in one of the cameras while still having a low number of objects that are detected falsely as the object type to be detected, i.e., a low number of false positive detections.

The detection information may comprise a detection score or a detection probability. Different cameras may have different pre-conditions to detect people due to camera resolution, installation positions of different cameras, and their processing power, which is turn impacts characteristics of a video network that is used together with the cameras. An example of these characteristics is a size of the image that is inputted to the video network. One person that is slightly occluded in one camera's image frames may be fully visible in another camera's image frames. One person that has a too low pixel density to be detected in one camera may be detectable in another camera where the pixel density of the person is higher.

The camera system may need to figure out a spatial overlap between cameras. For example, the camera system may be presented with or determine an overlap of the areas captured by the cameras that are to share detection information. This may be done via known methods of scene segmentation, using information of geolocation, pan and tilt angle, zoom, field of view and installation height.

An image-processing device, such as a camera, gathers detection scores from surrounding cameras on objects in an area which is captured by two or more cameras. The area may be referred to as a spatially overlapped area.

The image-processing device adjusts the detection score accordingly based on the detection score from at least one the other cameras.

The image-processing device may apply privacy masks to detected objects based on the adjusted detection score. This will be explained in more detail below, for example in relation to action 503 of FIG. 5.

Exemplifying embodiments herein will now be described with reference to FIGS. 4a, 4b, 4c, 4d and 5 and with further reference to FIGS. 1, 2a, 2b and 3.

Figure 4A:
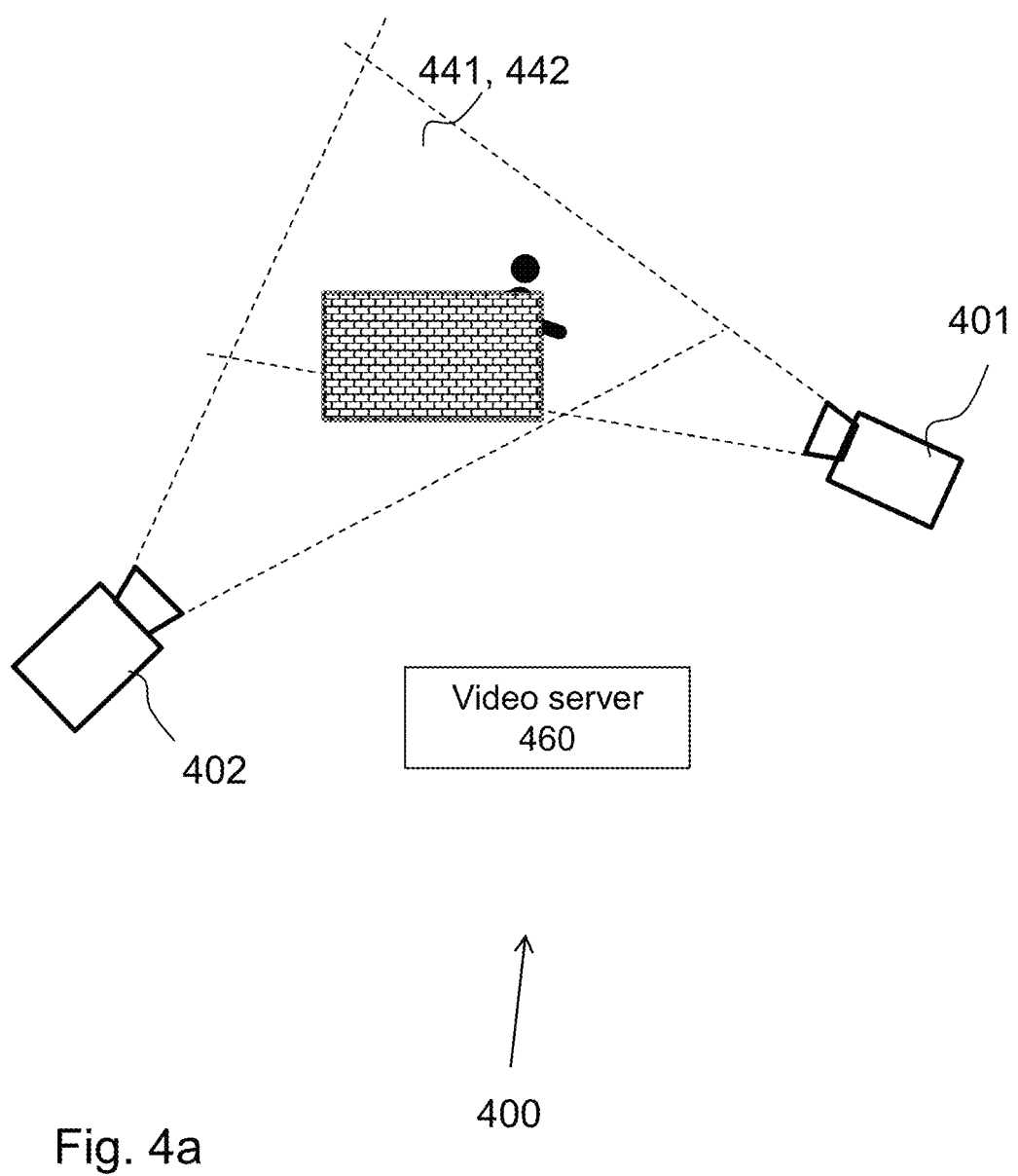
FIG. 4a is a schematic block diagram illustrating embodiments of a method in an image-processing device.

FIG. 4a illustrates a scene including an object, such as a person, occluded by another object, such as a wall, and a multi-camera system 400. The multi-camera system 400 comprises at least a first camera 401 and a second camera 402. The first camera 401 and the second camera 402 may be video cameras. The multi-camera system 400 may also comprise a video server 460. The first camera 401 and the second camera 402 may capture the object from different angles.

In a scenario wherein embodiments may be implemented, the first camera 401 may capture a large part of the whole person, while the second camera 402 only captures a lesser part of the person, such as a head and an arm of the person. Each of the first and second cameras 401, 402 may assign a detection score, e.g., a probability value indicating that the detected object belongs to an object type, such as humans.

Figure 4B:
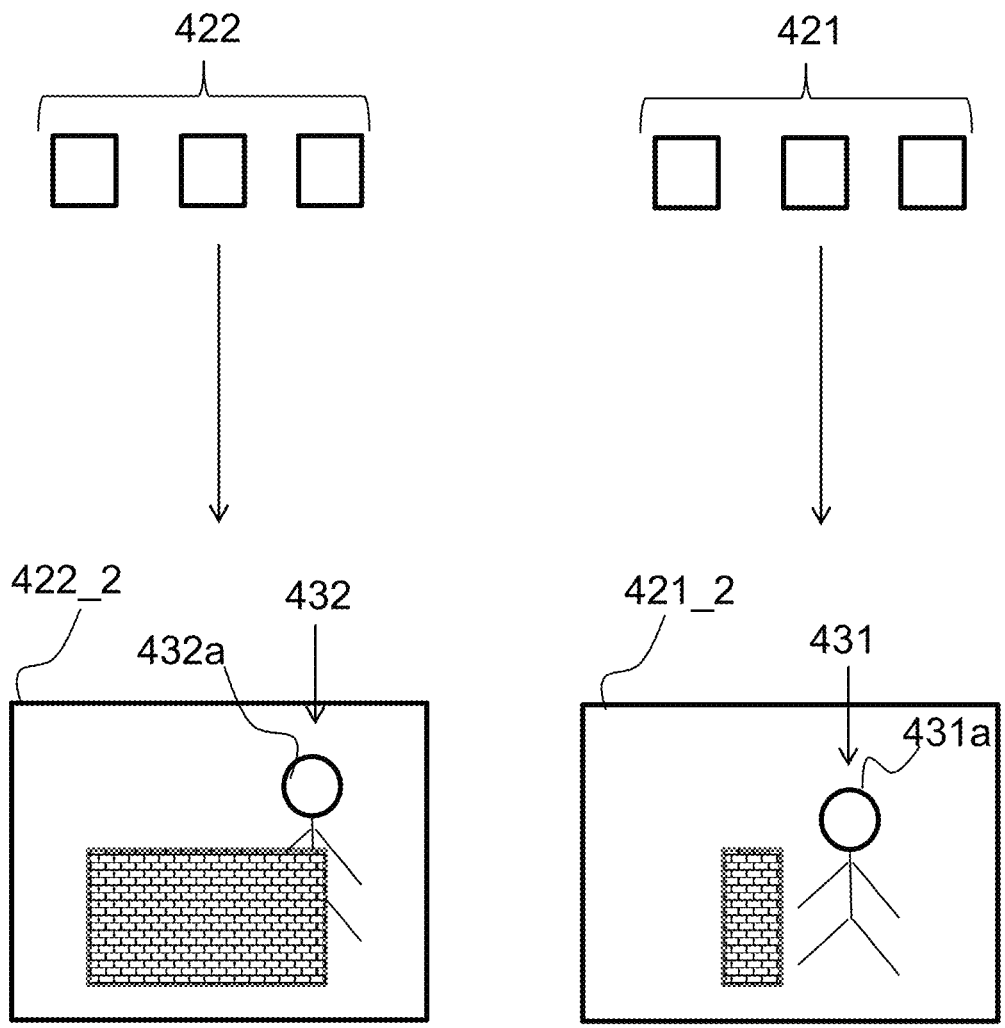
FIG. 4b is a schematic block diagram illustrating embodiments of a method in an image-processing device.

FIG. 4b illustrates a first stream of image frames 421 captured by the first camera 401 of the multi-camera system 400 and a second stream of image frames 422 captured by the second camera 402 of the camera system 400. The second camera 402 is different from the first camera 401. The first stream of image frames 421 comprises an image frame 421_2 capturing a first object 431. The first object 431 may comprise a first part 431a. The second stream of image frames 422 comprises an image frame 422_2 capturing a second object 432. The second object 432 may comprise a second part 432a. In a scenario herein, the first object 431 may correspond to the second object 432 in that it is the same real object that has been captured. Also, the first part 431a may correspond to the second part 432a.

Figure 5:
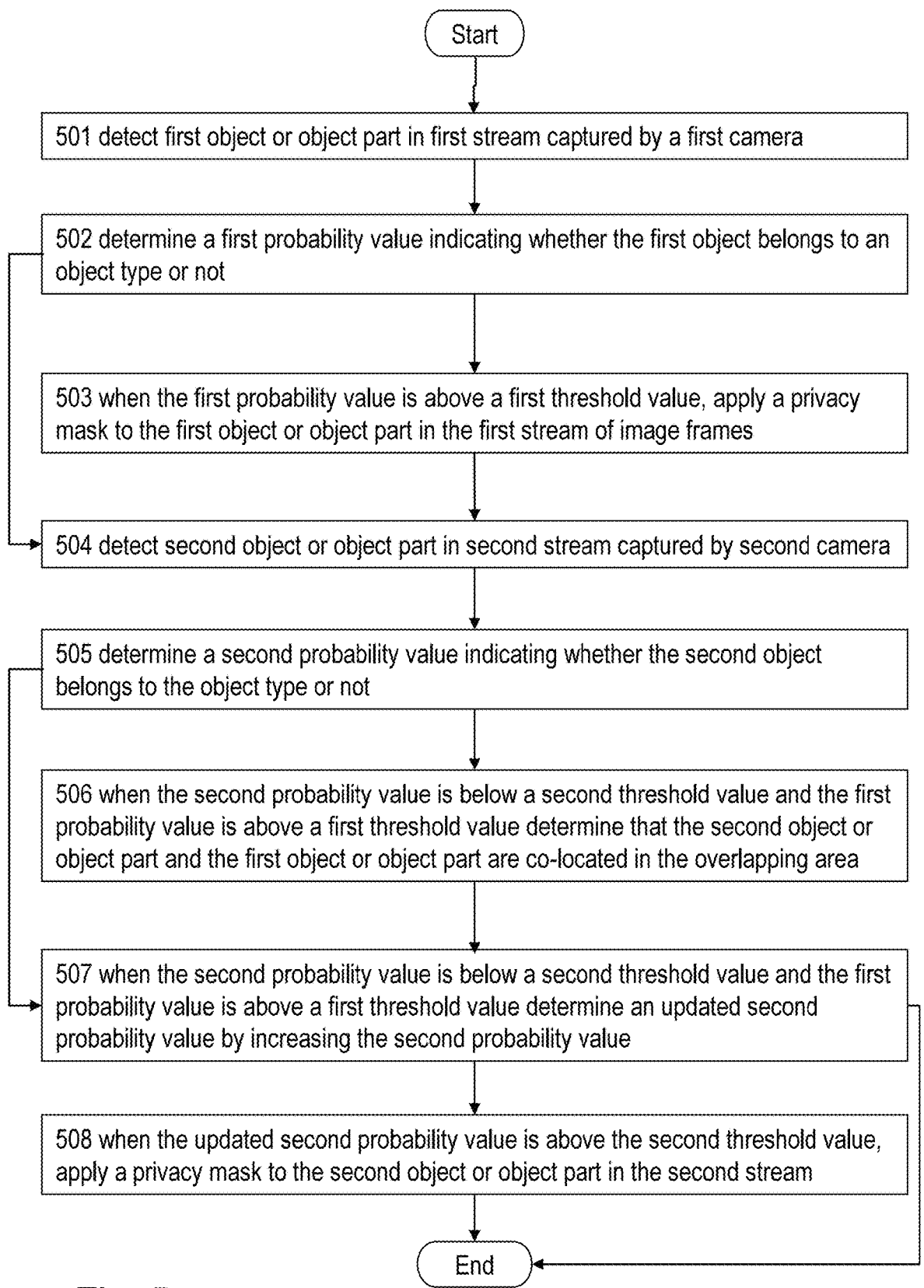
FIG. 5 is a flowchart illustrating embodiments of a method in an image-processing device.

FIG. 5 illustrates a flowchart describing a method for determining a probability value indicating a probability that an object captured in a stream of image frames 422 belongs to an object type, such as a specific object type. For example, the object type may be humans or animals. In other words, the method may be for determining the probability of the object belonging to the object type.

The method may be performed in the camera system 400 and may more specifically be for masking or counting an object captured in a stream of image frames. The masking or counting of the object may be performed when the probability value indicating that an object captured in a stream of image frames 422 belongs to an object type is above a threshold value for masking the object or a threshold value for counting the object. The threshold value for masking the object and the threshold value for counting the object may be different.

In particular, the embodiments may be performed by an image-processing device of the multi-camera system 400. The image-processing device may be any of the first camera 401 and the second camera 402 or the video-server 460. The first camera 401 and the second camera 402 may each be a video camera, such as a surveillance camera.

The below actions may be taken in any suitable order, e.g., in another order than the order presented below.

Action 501

The method comprises detecting the first object 431 or the first part 431a of the first object 431 in a first area 441 of a scene captured in the first stream of image frames 421 captured by the first camera 401 of the multi-camera system 400.

Action 502

The method further comprises determining, based on characteristics of the first object 431 or of the first part 431a of the first object 431, a first probability value indicating a first probability that the detected first object 431 or first part 431a belongs to the object type, such as humans. In other words, the method comprises determining the first probability of the first object belonging to the object type.

For example, the determining may be performed by weighting probability values for several parts of the first object 431. A respective probability value indicating a respective probability that the detected part 431a of the first object 431 belongs to an object part type may be determined based on characteristics of the detected part 431a of the first object 431.

Action 503

When the first probability value is above a first threshold value it may be determined that the detected first object 431 or first part 431a belongs to the object type, such as humans. Further, when the first probability value is above the first threshold value, some further action may be performed: For example, a privacy mask, such as a masking filter or a masking overlay, may be applied to the first object 431 or to at least a part of the first object 431, such as the first part 431a of the first object 431, in the first stream of image frames 421 in order to mask out, e.g. conceal, the first object 431 or the at least part of the first object 431, such as the first part 431a of the first object 431, in the first stream of image frames 421. In particular, the privacy mask may be obtained by masking out an area in each image frame and may comprise: color masking, which may also be referred to solid color masking or monochrome masking, mosaic masking, also referred to as pixelation, pixelated privacy masking or transparent pixelated, Gaussian blur, Sobel filter, background model masking by applying the background as mask (the object looks transparent), Chameleon mask (a mask that changes colour dependent on the background). In a detailed example, a color mask may be obtained by ignoring the image data and using another pixel value instead for a pixel to be masked. For example, the other pixel value may correspond to a specific color such as red or grey.

In another embodiment the object may be counted as specific pre-defined object when the first probability value is above the first threshold value. Thus, the first threshold value may be a masking threshold value, a counting threshold value or another threshold value associated with some other function to be performed on the object as a consequence of the first probability value being above the first threshold value.

Action 504

The method further comprises detecting the second object 432 or the second part 432a of the second object 432 in a second area 442 of the scene captured in the second stream of image frames 422 by the second camera 402 of the camera system 400. The second camera 402 is different from the first camera 401. The second area 442 at least partly overlaps the first area 441.

Action 505

The method further comprises determining, based on characteristics of the second object 432 or of the second part 432a of the second object 432, a second probability value indicating a second probability that the detected second object 432 or the second part 432a belongs to the object type. In other words, the method comprises determining the second probability of the second object belonging to the object type.

When the second probability value is above a second threshold value it may be determined that the detected second object 432 or second part 432a belongs to the object type, such as humans. In other words, the detected second object 432 or second part 432a may be detected as a human or belonging to a human.

When the second probability value is below the second threshold value it may be determined that the second object 432 does not belong to the object type. However, in embodiments herein the method continues to evaluate whether the second object 432 belongs to the object type also when the second probability value is below the second threshold value by taking into account the first probability value from the first camera 401.

Action 506

A yet further condition for continued evaluation of the detection of the second object 432 based on the first probability value may be a determination of co-location of the first object 431 and the second object 432 to make sure that the first object 431 is the same object as the second object 432 and thus that it is appropriate to take into account the first probability value when evaluating detection of the second object 432.

Thus, the method may further comprise determining that the second object 432 or the second part 432*a* of the second object 432 and the first object 431 or the first part 431*a* of the first object 431 are co-located in an overlapping area of the second area 442 and the first area 441.

In other words, the method may further comprise determining that the first and second objects 431, 432 are the same object.

For example, it may be determined that the second object 432 and the first object 431 are co-located. For example, it may be determined that a first person in the first stream of image frames 421 is co-located with a second person in the second stream of image frames 422. Based on the determination of the co-location it may be determined that the first person is the same person as the second person. For example, if it is determined that the first object 431 is a person with 90% probability and it is further determined that the second object 432 is a person with 70% probability and there are no other objects detected in the image frames, then it may be determined that it is probable that the person is the same person.

In other words, it may be determined that the first and second objects 431, 432 are linked, for example by determining that motion track entries associated with the first and second objects 431, 432 are linked (i.e., determined to belong to one real-world object) given a matching level based on a set of constraints. The track-entries may be created based on received first and second image series and determined first and second characterizing feature sets and movement data.

In another example, it may be determined that the second object 432 is co-located with the first part 431*a* of the first object 431.

In another example, it may be determined that the second part 432*a* of the second object 432 is co-located with the first object 431.

In another example, it may be determined that the second part 432*a* of the second object 432 is co-located with the first part of the first object 431. For example, it may be determined that a head of the first object is co-located with a head of the second object. This method may be applied to other parts such as arms, torsos, and legs as well.

Action 506 may be performed after or before action 507.

Action 507

When the second probability value is below a second threshold value and the first probability value is above the first threshold value the method comprises determining an updated second probability value by increasing the second probability value.

The second threshold value may also be a masking threshold value, a counting threshold value or another threshold value associated with some other function to be performed on the second object 432 or on the second part 432*a* as a consequence of the second probability value being above the second threshold value.

Figure 4C:
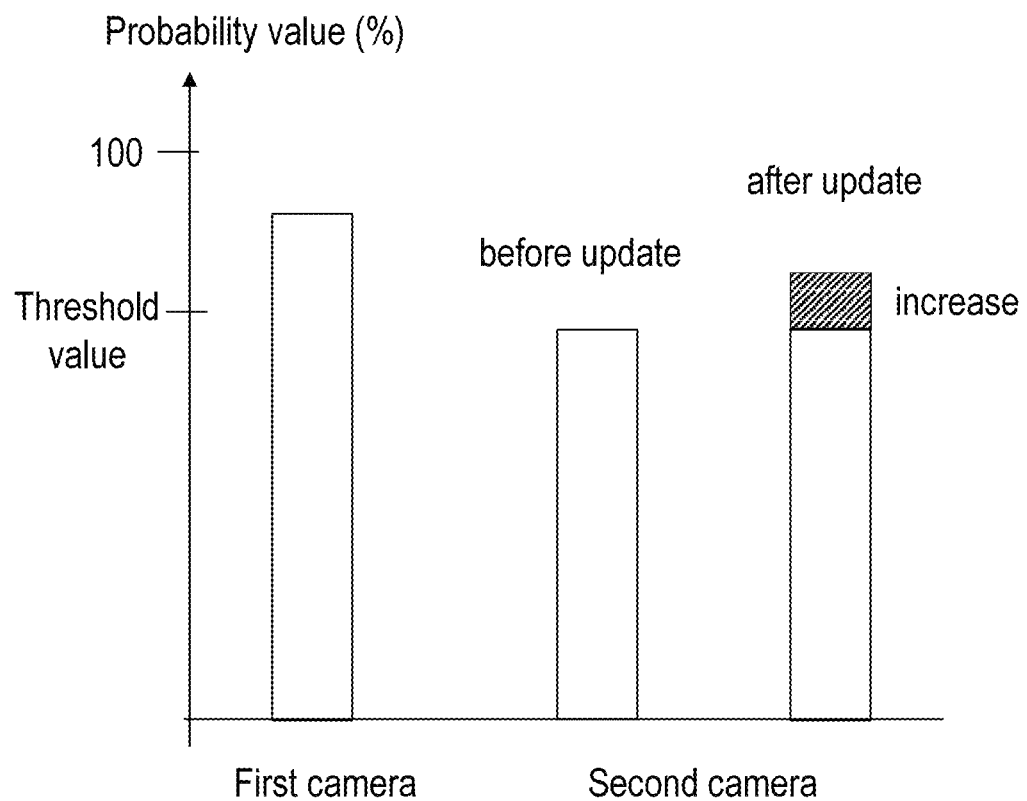
FIG. 4c is a schematic block diagram illustrating embodiments of a method in an image-processing device.

The second threshold value and the first threshold value may be different. However, in some embodiments herein they are the same. FIG. 4*c* illustrates a simple example of how the second probability value may be increased from below the second threshold value to above the second threshold value when the first and second threshold values are the same and the first probability value is above the first threshold.

In some embodiments herein the first threshold value is 90%, while the second threshold value is 70%. The second threshold value may be lower than the first threshold value. This may for example be an advantage when the second object 432 is partly occluded by some other object, such as a wall.

In a scenario, the first camera 401 determines the first probability value to be 95% for the first object to be a human. The second camera 402 determines the second probability value to be 68% for the second object to be a human. Then the second probability value may be increased, e.g., with 5 or 10%. The increase may be a fixed value as long as the first probability value is above the first threshold value. However, in some embodiments herein the increasing of the second probability value is based on the first probability value. For example, the increase of the second probability value may be proportional against the first probability value. In some embodiments herein the increase of the second probability value is 5% when the first probability value is 60% and the increase of the second probability value is 10% when the first probability value is 70% and the increase of the second probability value is 15% when the first probability value is 80%.

The increasing of the second probability value based on the first probability value may comprise: determining a difference between the first probability value and the first threshold value and increasing the second probability value based on the difference. For example, if the difference between the first probability value and the first threshold value is 5% then the second probability value may be increased by 10%. In another example, if the difference between the first probability value and the first threshold value is 10% then the second probability value may be increased by 20%.

In some other embodiments the increasing of the second probability value based on the first probability values comprises increasing the second probability value with the difference. For example, if the difference between the first probability value and the first threshold value is 5% then the second probability value may be increased by 5%. In another example, if the first probability value is 95% and a common threshold value, such as a common masking threshold value, is 80%, the difference is 15%, and thus the second probability value of e.g. 67% may be increased by 15% resulting in 82% which is above the common threshold value of 80%. Consequently, the second object may also be masked or counted.

In some embodiments herein the updated second probability value is determined in response to determining that the second object 432 or part 432*a* of the second object 432 and the first object 431 or part 431*a* of the first object 431 are co-located in the overlapping area according to action 506 above.

In some embodiments herein the respective first and second threshold value is specific for the type of object or object part. For example, the respective first and second threshold value may be specific for different object types or for different object part types, such as head, arm, torso, leg etc. or both. Since it is likely more important to mask a face than an arm, a masking threshold value for the face may be lower than another masking threshold value for the arm. For example, the masking threshold value for heads may be 70% while the masking threshold value for arms may be 90% and the threshold value for torsos may be 80%.

A further condition for determining the updated second probability value by increasing the second probability value may be that the second probability value in addition to being below the second threshold value is above a third threshold value. Thus, it may be an additional condition that the second probability value is above the lower third threshold value. A reason for why it may be an advantage that the second probability value is above the lower third threshold value is that if the second probability value is below the third threshold value, e.g., below 20%, the object detector is quite confident in that the object is not an object that should be masked, e.g., not a human. However, if the second probability value is between 20% and 80% the object may be an occluded person and therefore it's probability value may be increased if another camera is more confident in the detection of the object as an object that is to be masked.

In some embodiments herein a second object part type of the second part 432a is the same object part type as a first object part type of the first part 431a. For example, the method may compare a first face with a second face and a first leg with a second leg etc.

It may be an advantage to only increase the second probability value when the difference between the first probability value and the first threshold value is above a fourth threshold value, e.g., when the difference is above 10%. In this way the number of false positives may be controlled. For example, with a larger threshold value difference the number of false positives may be lower.

For example, in a scenario the first threshold value is 70%, the second threshold value is 90% and the fourth threshold value is 75%. A first probability value of 72% is large enough for detecting the first object as a human in the first stream of image frames 421 but it may be considered too low for increasing the second probability value.

Action 508

In some embodiments herein further actions may be performed in response to the updated second probability value being above the second threshold value and in response to determining that the second object belongs to a certain object type. For example, when the object type is an object type to be masked out then the first and second threshold values may be for masking objects or parts of objects of the object type to be masked out. Then the method further comprises: when the updated second probability value is above the second threshold value, applying a privacy mask to at least a part of the second object 432, such as the second part 432a, in the second stream of image frames 422 to mask out that part. For example, if the face of a human is captured in both the first and second camera 401, 402 and a face score is updated for the second camera 402 this may lead to privacy masking of the face in the second stream of images 422. Thus, the method may further comprise anonymising an unidentified person by removal of identifying features, e.g., by any of the methods mentioned above in action 503.

In some other embodiments the object type is an object type to be counted. Then the first and second threshold values may be for counting objects or parts of objects of the object type to be counted. Then the method further comprises: when the updated second probability value is above the second threshold value, increasing a counter value associated with the second stream of image frames 422. For example, the counter value may be for the object or the object part.

Figure 4D:
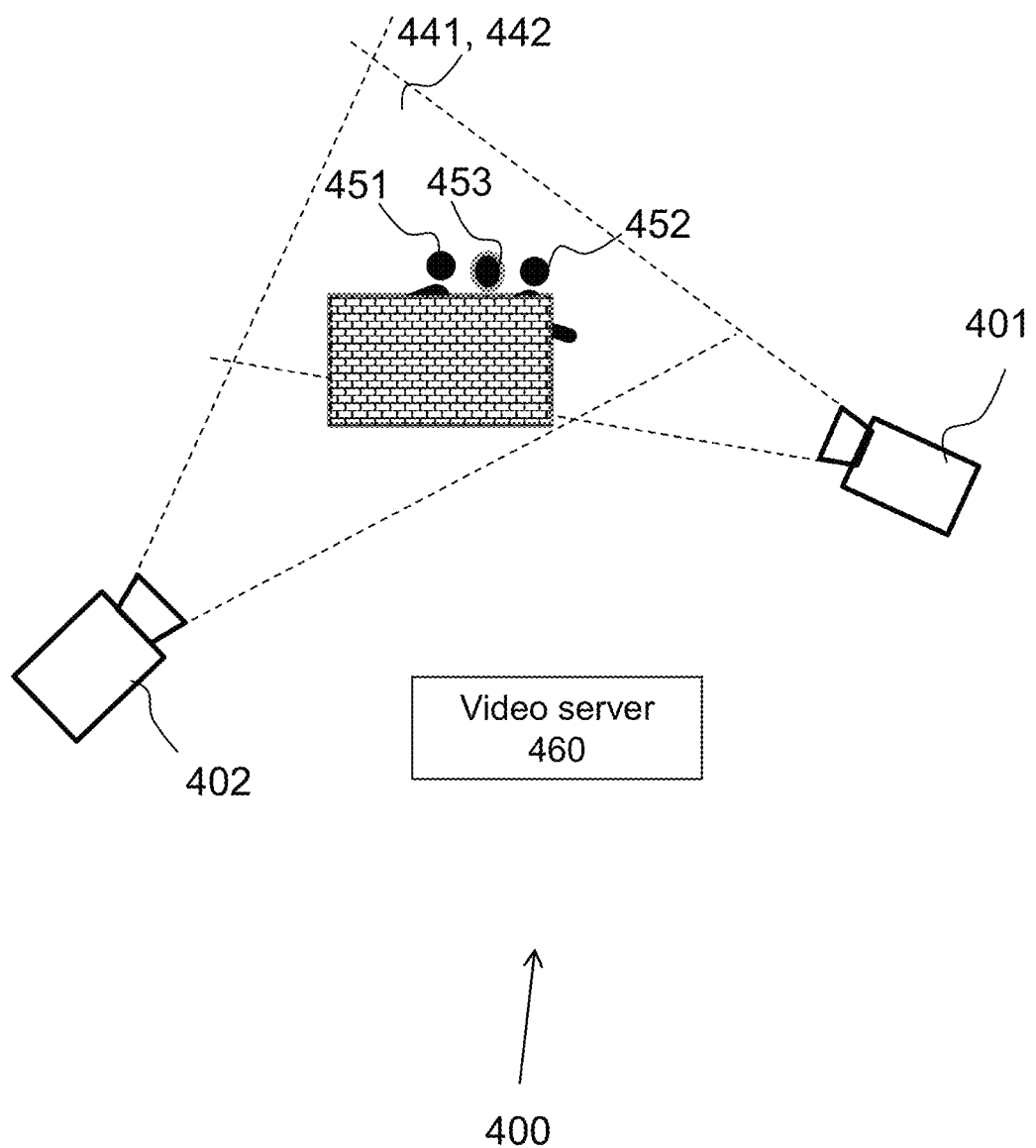
FIG. 4d is a schematic block diagram illustrating embodiments of a method in an image-processing device.

FIG. 4d illustrates a scenario in which a scene comprises a first human 451 and a second human 452 and a third object 453 between the two humans 451, 452. A shape of the third object 453 resembles a shape of a body part of the humans 451, 452. The third object may for example be a balloon which resembles a head. In an example, the second camera 402 captures the three objects 451, 452, 453 and the method of FIG. 5 may be used for each of the three objects 451, 452, 453. Thus, each of the three objects 451, 452, 453 in FIG. 4d may be the second object 432 in the second stream of image frames 422. Correspondingly, each of the three objects in FIG. 4d may be the first object 431 in the first stream of image frames 421.

The method may be performed by the second camera or by the video server 460, or even by the first camera 401.

The method may then comprise determining the second probability value. The second probability value may be 69%, 70% and 80% respectively for the first human 451 (left), the third object 453 (balloon) and the second human 452 (right). In a scenario the second threshold value for detecting and masking a human is 80%. This means that without the method of FIG. 5 only the second human 452 will be masked. If a general decrease of the second threshold value is performed by 10% the third object 453 will be masked but not the first human 451. However, if the first probability value derived from the first stream of image frames 421 is above the first threshold value and the second probability value is below the second threshold value for a respective first object 431, such as the first human 451 and the second human 452, then the second probability value is increased. Thus, if the first human 451 is detected in the first stream of image frames 421 from the first camera 401 with the first probability value being 90% and indicating that the detected first human 451 belongs to the human type, then the second probability value is increased, e.g., by 15%. The updated second probability value will then be 84% which is above the second threshold value and the first human 451 will be masked. The first probability value of the third object 453 indicating the probability of the detected third object 453 belonging to a human object type will be low, e.g. 18%. This means that since the first probability value of the third object 453 is below the first threshold value the second probability value will not be increased. Thus, the third object 453 will not be masked in any of the stream of images from the first and second cameras 401, 402.

Figure 6:
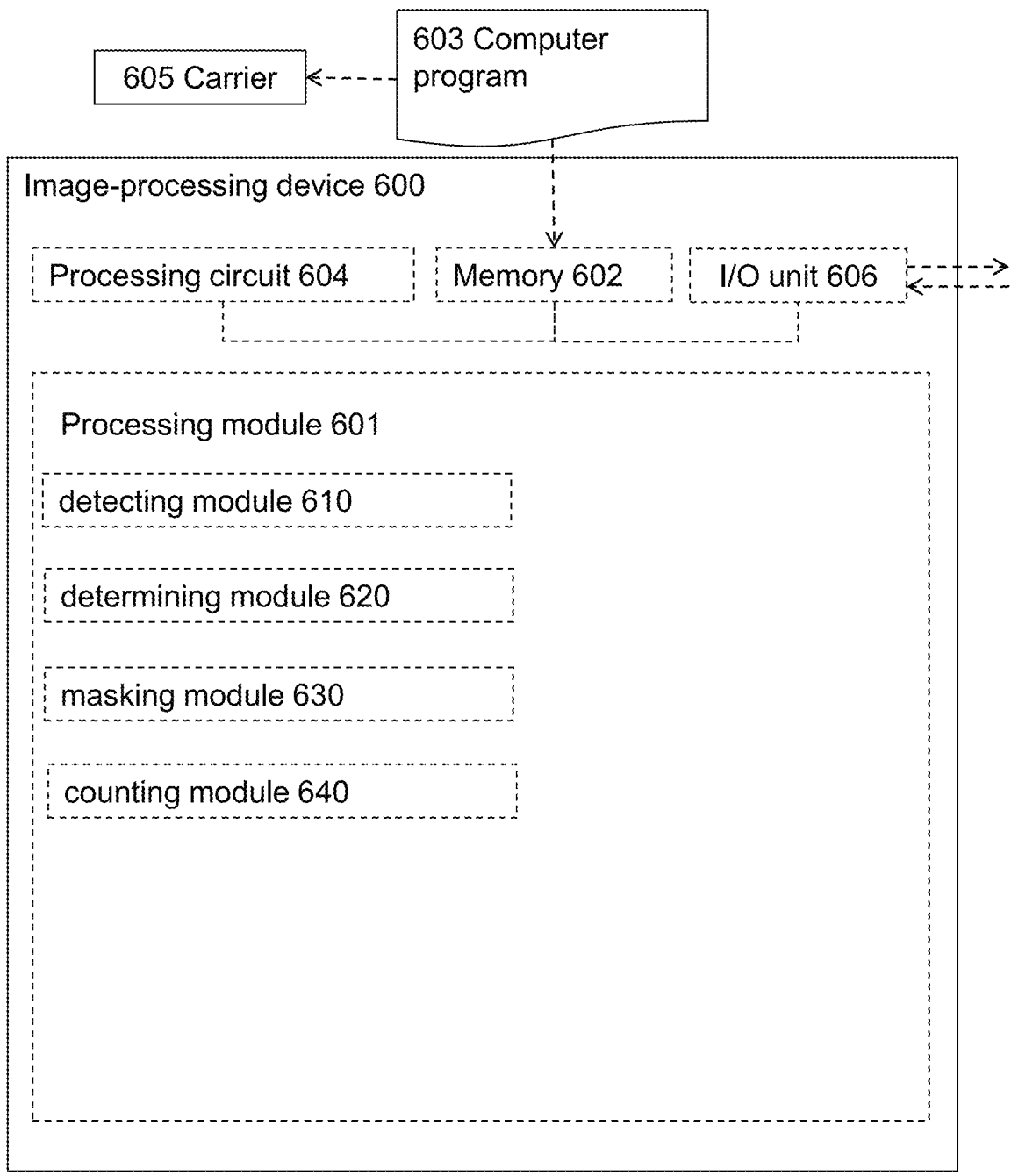
FIG. 6 is a block diagram illustrating embodiments of the image-processing device.

With reference to FIG. 6, a schematic block diagram of embodiments of an image-processing device 600 is shown. As mentioned above, the image-processing device 600 is configured for determining the probability value indicating that the object captured in a stream of image frames belongs to an object type. Further, the image-processing device 600 may be part of the multi-camera system 400.

As mentioned above, the image-processing device 600 may comprise or be any of a camera, such as a surveillance camera, a monitoring camera, a camcorder, a network video recorder, and the wireless communication device 130. In particular, the image-processing device 600 may be the first camera 401 or the second camera 402, such as a surveillance camera, or the video-server 460 which may be part of the multi-camera system 400. The method for determining the probability value indicating that the object captured in the stream of image frames belongs to the object type may also be performed in a distributed manner in several image-processing devices, such as in the first camera 401 and the second camera 402. For example, actions 501-503 may be performed by the first camera 401, while actions 504-508 may be performed by the second camera 402.

The image-processing device 600 may further comprise a processing module 601, such as a means for performing the methods described herein. The means may be embodied in the form of one or more hardware modules and/or one or more software modules.

The image-processing device 600 may further comprise a memory 602. The memory may comprise, such as contain or store, instructions, e.g. in the form of a computer program 603, which may comprise computer readable code units which when executed on the image-processing device 600 causes the image-processing device 600 to perform the method of determining the probability value indicating that the object captured in the stream of image frames belongs to the object type. The image-processing device 600 may comprise a computer and then the computer readable code units may be executed on the computer and cause the computer to perform the method of determining the probability value indicating that the object captured in the stream of image frames belongs to the object type.

According to some embodiments herein, the image-processing device 600 and/or the processing module 601 comprises a processing circuit 604 as an exemplifying hardware module, which may comprise one or more processors. Accordingly, the processing module 601 may be embodied in the form of, or 'realized by', the processing circuit 604. The instructions may be executable by the processing circuit 604, whereby the image-processing device 600 is operative to perform the methods of FIG. 5 as described above. As another example, the instructions, when executed by the image-processing device 600 and/or the processing circuit 604, may cause the image-processing device 600 to perform the methods according to FIG. 5.

In view of the above, in one example, there is provided an image-processing device 600 for determining the probability value indicating that the object captured in a stream of image frames belongs to an object type.

Again, the memory 602 contains the instructions executable by said processing circuit 604 whereby the image-processing device 600 is operative for performing the method according to FIG. 5.

FIG. 6 further illustrates a carrier 605, or program carrier, which comprises the computer program 603 as described directly above. The carrier 605 may be one of an electronic signal, an optical signal, a radio signal and a computer readable medium.

In some embodiments, the image-processing device 600 and/or the processing module 601 may comprise one or more of a detecting module 610, a determining module 620, a masking module 630, and a counting module 640, as exemplifying hardware modules. In other examples, one or more of the aforementioned exemplifying hardware modules may be implemented as one or more software modules.

Moreover, the processing module 601 may comprise an Input/Output unit 606. According to an embodiment, the Input/Output unit 606 may comprise an image sensor configured for capturing the raw image frames described above such as the raw image frames comprised in the video stream 310 from the image sensor 301.

According to the various embodiments described above, the image-processing device 600 and/or the processing module 601 and/or the detection module 610 is configured to receive the captured image frames 311, 312 of the image stream 310 from the image sensor 301 of the image-processing device 600.

The image-processing device 600 and/or the processing module 601 and/or the detecting module 610 is configured to detect the first object 431 or the first part 431a of the first object 431 in the first area 441 of the scene captured in the first stream of image frames 421 captured by the first camera 401 of the multi-camera system 400.

The image-processing device 600 and/or the processing module 601 and/or the determining module 620 is further configured to determine, based on characteristics of the first object 431 or of the first part 431a of the first object 431, the first probability value indicating the first probability that the detected first object 431 or first part 431a belongs to the object type.

The image-processing device 600 and/or the processing module 601 and/or the detecting module 610 is further configured to detect the second object 432 or the second part 432a of the second object 432 in the second area 442 of the scene captured in the second stream of image frames 422 by the second camera 402 of the camera system 400. The second camera 402 is different from the first camera 401. The second area 442 at least partly overlaps the first area 441.

The image-processing device 600 and/or the processing module 601 and/or the determining module 620 is further configured to determine, based on characteristics of the second object 432 or of the second part 432a of the second object 432, the second probability value indicating the second probability that the detected second object 432 or the second part 432a belongs to the object type.

The image-processing device 600 and/or the processing module 601 and/or the detecting module 610 is further configured to when the second probability value is below the second threshold value and the first probability value is above the first threshold value determine an updated second probability value by increasing the second probability value.

The image-processing device 600 and/or the processing module 601 and/or the determining module 620 may be further configured to increase the second probability value based on the first probability value.

The image-processing device 600 and/or the processing module 601 and/or the determining module 620 may be further configured to increase the second probability value based on the first probability value by determining the difference between the first probability value and the first threshold value and increasing the second probability value based on the difference.

The image-processing device 600 and/or the processing module 601 and/or the masking module 630 may further be configured to apply the privacy mask to the at least part of the second object 432 in the second stream of image frames 422 when the updated second probability value is above the second threshold value.

The image-processing device 600 and/or the processing module 601 and/or the counting module 640 may further be configured to increase the counter value associated with the second stream of image frames 422 when the updated second probability value is above the second threshold value.

The image-processing device 600 and/or the processing module 601 and/or the determining module 620 may be further configured to increase the second probability value when the second probability value in addition to being below the second threshold value is above the third threshold value.

The image-processing device 600 and/or the processing module 601 and/or the determining module 620 may be further configured to determine that the second object 432 or the second part 432*a* of the second object and the first object 431 or the first part 431*a* of the first object 431 are co-located in the overlapping area of the second area 442 and the first area 441 and determine the updated second probability value in response to determining that the second object 432 or the second part 432*a* of the second object 432 and the first object 431 or the first part 431*a* of the first object 431 are co-located in the overlapping area.

As used herein, the term "module" may refer to one or more functional modules, each of which may be implemented as one or more hardware modules and/or one or more software modules and/or a combined software/hardware module. In some examples, the module may represent a functional unit realized as software and/or hardware.

As used herein, the term "computer program carrier", "program carrier", or "carrier", may refer to one of an electronic signal, an optical signal, a radio signal, and a computer readable medium. In some examples, the computer program carrier may exclude transitory, propagating signals, such as the electronic, optical and/or radio signal. Thus, in these examples, the computer program carrier may be a non-transitory carrier, such as a non-transitory computer readable medium.

As used herein, the term "processing module" may include one or more hardware modules, one or more software modules or a combination thereof. Any such module, be it a hardware, software or a combined hardware-software module, may be a connecting means, providing means, configuring means, responding means, disabling means or the like as disclosed herein. As an example, the expression "means" may be a module corresponding to the modules listed above in conjunction with the figures.

As used herein, the term "software module" may refer to a software application, a Dynamic Link Library (DLL), a software component, a software object, an object according to Component Object Model (COM), a software component, a software function, a software engine, an executable binary software file or the like.

The terms "processing module" or "processing circuit" may herein encompass a processing unit, comprising e.g. one or more processors, an Application Specific integrated Circuit (ASIC), a Field-Programmable Gate Array (FPGA) or the like. The processing circuit or the like may comprise one or more processor kernels.

As used herein, the expression "configured to/for" may mean that a processing circuit is configured to, such as adapted to or operative to, by means of software configuration and/or hardware configuration, perform one or more of the actions described herein.

As used herein, the term "action" may refer to an action, a step, an operation, a response, a reaction, an activity or the like. It shall be noted that an action herein may be split into two or more sub-actions as applicable. Moreover, also as applicable, it shall be noted that two or more of the actions described herein may be merged into a single action.

As used herein, the term "memory" may refer to a hard disk, a magnetic storage medium, a portable computer diskette or disc, flash memory, Random Access Memory (RAM) or the like. Furthermore, the term "memory" may refer to an internal register memory of a processor or the like.

As used herein, the term "computer readable medium" may be a Universal Serial Bus (USB) memory, a DVD-disc, a Blu-ray disc, a software module that is received as a stream of data, a Flash memory, a hard drive, a memory card, such as a MemoryStick, a Multimedia Card (MMC), Secure Digital (SD) card, etc. One or more of the aforementioned examples of computer readable medium may be provided as one or more computer program products.

As used herein, the term "computer readable code units" may be text of a computer program, parts of or an entire binary file representing a computer program in a compiled format or anything there between.

As used herein, the terms "number" and/or "value" may be any kind of number, such as binary, real, imaginary or rational number or the like. Moreover, "number" and/or "value" may be one or more characters, such as a letter or a string of letters. "Number" and/or "value" may also be represented by a string of bits, i.e. zeros and/or ones.

As used herein, the expression "in some embodiments" has been used to indicate that the features of the embodiment described may be combined with any other embodiment disclosed herein.

Even though embodiments of the various aspects have been described, many different alterations, modifications and the like thereof will become apparent for those skilled in the art. The described embodiments are therefore not intended to limit the scope of the present disclosure.

The invention claimed is:

1. A method, performed in a multi-camera system, for determining a probability value indicating a probability that an object captured in a stream of image frames belongs to an object type, the method comprising:
   detecting a first object or a first part of the first object in a first area of a scene captured in a first stream of image frames captured by a first camera of the multi-camera system;
   determining, based on characteristics of the first object or of the first part of the first object, a first probability value indicating a first probability that the detected first object or first part belongs to the object type;
   when the first probability value is above a first threshold value, determining that the detected first object or first part belongs to the object type;
   detecting a second object or a second part of the second object in a second area of the scene captured in a second stream of image frames by a second camera of the camera system different from the first camera, wherein the second area at least partly overlaps the first area;
   determining, based on characteristics of the second object or of the second part of the second object, a second probability value indicating a second probability that the detected second object or the second part belongs to the object type, wherein when the second probability value is above a second threshold value, determining that the detected second object or second part belongs to the object type; and
   when the second probability value is below the second threshold value and the first probability value is above the first threshold value determining an updated second probability value by increasing the second probability value, wherein the increasing of the second probability value is based on the first probability value and comprises:
   determining a difference between the first probability value and the first threshold value; and increasing the second probability value based on the difference between the first probability value and the first threshold value.

2. The method according to claim 1, wherein the increasing of the second probability value based on the difference between the first probability value and the first threshold value comprises:
increasing the second probability value with the difference.

3. The method according to claim 1, wherein the object type is an object type to be masked out, the first and second threshold values are for masking objects or parts of objects of the object type to be masked out, the method further comprising: when the updated second probability value is above the second threshold value, applying a privacy mask to at least a part of the second object in the second stream of image frames.

4. The method according to claim 1, wherein the object type is an object type to be counted, the first and second threshold values are for counting objects or parts of objects of the object type to be counted, the method further comprising: when the updated second probability value is above the second threshold value, increasing a counter value associated with the second stream of image frames.

5. The method according to claim 1, wherein the respective first and second threshold value is specific for the type of object or object part.

6. The method of claim 1, wherein a further condition for determining the updated second probability value by increasing the second probability value is that the second probability value in addition to being below the second threshold value is above a third threshold value.

7. The method of claim 1, further comprising determining that the second object or the second part of the second object and the first object or the first part of the first object are co-located in an overlapping area of the second area and the first area; and determining the updated second probability value in response to determining that the second object or the second part of the second object and the first object or the first part of the first object are co-located in the overlapping area.

8. The method of claim 1, wherein a second object part type of the second part is the same object part type as a first object part type of the first part.

9. An image-processing device of a multi-camera system configured to perform the method according to claim 1.

10. The image-processing device according to claim 9, wherein the image-processing device is a camera, such as a surveillance camera, or a video-server.

11. A non-transitory memory that has stored therein a computer program, comprising computer readable code units which when executed on an image-processing device causes the image-processing device to perform the method according to claim 1.

12. The method according to claim 1, wherein the second threshold value is lower than the first threshold.

13. The method according to claim 1, further comprising determining that the second object belongs to the object type in response to the updated second probability value being above the second threshold value.

* * * * *